3,151,107
WATER-SOLUBLE IRON COMPLEXES OF CARBOXYMETHYL DEXTRAN

Hermann Heckel and Everette E. Witt, Dayton, Ohio, assignors to The Central Pharmacal Company, Seymour, Ind.
No Drawing. Filed Dec. 22, 1960, Ser. No. 77,516
2 Claims. (Cl. 260—209)

This invention relates to heavy metal complexes of certain carboxyalkyl dextrans, and more particularly to soluble complexes suitable for therapeutic administration.

It is an object of the invention to provide water-soluble complexes of heavy metals with certain carboxyalkyl dextrans, and in particular, carboxymethyl dextran, which are suitable for therapeutic administration where medication with heavy metals is required.

Another object of the invention is to provide metals, such as iron, in the form of complexes which are water-soluble, resistant to metal release under acidic environment but which are yet readily assimilable by the animal body.

A still further object is to provide an iron-containing substance which is adapted for administering iron to the body of animals, such as man, and which substance contains a relatively high proportionate amount of iron and which can be administered readily and safely in such a manner as to introduce appropriate amounts of iron capable of rapid assimilation into the body. Goodman and Gilman, "The Pharmacologic Basis of Therapeutics," page 1464 give the following daily oral doses to produce in human subjects a 1% rise per day in hemoglobin:

| Drug | Daily Dose | Iron Assimilated |
|---|---|---|
| Ferrous Sulfate | 180 mg. as iron | 27.2 mg. as iron. |
| Ferrous Ammonium Citrate | 1,000 mg. as iron | 23 mg. as iron. |

Novak and Buloff (U.S. Patent No. 2,856,366) describe the preparation of a stable alkaline solution of water-soluble salts of metals that normally yield under alkaline condition insoluble hydrous oxides through use of carboxymethyl dextrans. They recommend carboxymethyl dextran of molecular weights 2,000 to that of native dextrans and with degrees of substitution between 1.0 and 3.0. The extremely high alkalinity required to produce such stable solutions (pH 10 to 14) render such products unsuitable for therapeutic purposes.

In a later patent (U.S. Patent No. 2,856,398) Novak describes the preparation of carboxyalkyl dextran complexes with iron but states that those containing 20% to 30% iron "are only slowly soluble at pH above 7.0." One product described was only soluble to the extent of 13.5% at pH 7.85. For therapeutic purposes it is desirable, especially in liquid preparations, that solubility be complete and at pH values slightly under 7.0. The pH limitation is especially important when it is desired to incorporate therewith vitamins such as $B_{12}$.

Berger and Novak (U.S. Patent No. 2,862,920) produce a ferrous carboxymethyl dextran which is of a very low iron content, 12%, and which is soluble at pH 8.0 to 8.5. The high level of alkalinity required for solution is objectionable for therapeutic purposes as discussed above. Also, since the carboxymethyl dextran used is of a high degree of substitution with reference to carboxymethyl groups it would be expected that most of the iron would be liberated as ionic iron under conditions present in the stomach and thus induce nausea.

Heavy metals, particularly iron, have previously been used in medication and have been administered both orally and parenterally. Most of the iron compounds so used have been simple iron salts which in the stomach yield iron in ionic form and so tend to produce nausea. Their absorption efficiencies as indicated by Goodman and Gilman above are low. It is therefore of extreme interest to so complex the iron that it is quite slowly liberated, more in keeping with the ability of the body to absorb same. The iron complex with which this invention is particularly concerned possesses a high iron content which it releases only very slowly even under the strongly acidic conditions of the stomach. It is readily and completely water-soluble at pH values of 6.2 to 7.0. Such solutions are of exceptionally low viscosity even at levels of 100 mg. iron per ml. and may be sterilized without deleterious effects. The complex is non-astringent and the iron content is readily assimilated by the body.

We have found the above desirable properties of the complex to be attainable only through careful control of:

(1) The molecular weight of the dextran which is to be carboxyalkylated.
(2) The degree of substitution of the carboxyalkyl dextran.
(3) The alkalinity at which the carboxyalkyl dextran is reacted with the metal salt.
(4) The amount of metal complexed with the carboxyalkyl dextran.

The molecular weight of the dextran must be controlled in order that the solubility of the product will be such that an adequate dosage of metal such as iron per unit volume will be attained at a reasonable solution viscosity. The degree of substitution must be controlled for the reason that below the preferred range the product is only partially soluble. Above the preferred range the metal content of the product drops off and after a degree of substitution of 1.0 is passed the metal (e.g. iron) content becomes less stable toward the acid condition as represented by the stomach. The hydrogen ion concentration must be controlled during the reaction of the metal salt with the carboxyalkyl dextran for below the critical range the metal content of the product decreases and above the range the product is only partially soluble in water. The metal content must be limited for too great a content tends to produce water insolubility.

The quality of the product as regards water solubility is definitely enhanced by the presence of a chemical such as sodium glycolate in the reaction mixture during the condensation of the carboxyalkyl dextran with the metal salt. The sodium glycolate allows a very rapid addition of the metal salt solution without danger of precipitation of metal hydroxide. It seems that its presence directs the complexing of the metal in that direction which produces a soluble product and opposes that reaction tending to produce an insoluble product. Such products as are produced under the above controls and in the presence of sodium glycolate are completely water-soluble. Sodium lactate, sodium citrate, or sodium acetate can be used in place of the glycolate.

The experiments listed in the Table I were made in the process of determining the critical ranges. In each experiment 200 g. native dextran (HRRL, B-512) was hydrolyzed with hydrochloric acid to a molecular weight of 15,000 to 25,000 and then reacted with the quantity of sodium chloracetate given in col. 2, and sodium hydroxide in col. 3, to yield the degree of substitution given in col. 4, of the resulting carboxymethyl dextran. Some sodium glycolate is formed during the reaction as a by-product but the concentration is not always sufficiently high so that column 5 indicates the quantity of sodium glycolate added prior to addition of the ferric chloride in the amounts given (as elemental iron) in column 6 and sodium hydroxide, column 7. The column 8 indicates the pH range maintained during the ferric chloride-sodium hydroxide addition. The column 9 indicates the iron content of the resultant product and column 10 the percent of the iron content liberated as ionic iron in one hour at pH 2.0 and 100° F. The column 11 indicates whether the product isolated through precipitation with methanol is completely water-soluble or not.

| Exp. No. | ClCH$_2$CO$_2$Na wt., g. | NaOH wt., g. | D.S.[1] | HOCH$_2$CO$_2$Na, g. | FeCl$_3$ wt. as Fe, g. | NaOH wt., g. | Range pH | Iron Content, Percent | Ionic Iron, pH 2.0, Percent | Complete Water Solubility |
|---|---|---|---|---|---|---|---|---|---|---|
| 6A   | 640 | 270 | 0.9  |     | 100 | 220 | 8–9      | 19 |    | Yes. |
| 10A  | 640 | 272 | 0.7  |     | 100 | 220 | 8–9      | 25 | 9  | Yes. |
| 10B  | 320 | 136 | 0.5  | 278 | 100 | 220 | 8–9      | 27 | 11 | Yes. |
| 12A  | 214 | 87  | 0.4  | 288 | 100 | 216 | 8–9      | 27 | 12 | Yes. |
| 13B  | 106 | 64  | 0.25 | 288 | 100 | 220 | 8–9      | 27 | 8  | No. |
| 14A  | 300 | 128 | 0.45 | 288 | 100 | 234 | 10–10.5  | 27 |    | No. |
| 15A  | 300 | 128 | 0.45 | 288 | 100 | 200 | 8.0±0.3  | 21 | 9  | Yes. |
| 15C  | 300 | 128 | 0.45 | 288 | 100 | 216 | 9.0±0.3  | 27 | 9  | Yes. |

[1] D.S.=number of carboxymethyl ether groups per anhydroglucose unit.

In the Table I the experiments 6A, 10A, 10B, 12A and 13B show the effect of the degree of substitution on the iron content of the product. Where the degree of substitution is high (6A), the iron content of the produce is low and where low (13B), the product is only partially soluble. The effect of pH during the ferric chloride condensation reaction is shown by the experiments 14A, 15A and 15C. At the high pH values used in 14A the product is only partially soluble in water and at the pH 8.0 ±0.3 used in 15A the iron content is low. At the pH 9.0 ±0.3 used in 15C the product is completely soluble and shows an iron content of 27%.

In particular, a native dextran derived from sucrose by the action of Leuconostoc mesenteroides, strain NRRL, B-512, is used although dextrans derived through other organisms can be used. The dextran is dissolved in water and hydrolyzed to a molecular weight of 1,000 to 50,000 or preferably 15,000 to 25,000 as determined by light scattering techniques. The resultant partially hydrolyzed dextran is reacted with a carboxylalkylating agent, e.g., sodium monochloracetate if carboxymethyl dextran is desired, in the presence of an alkali metal hydroxide, preferably sodium hydroxide, under a suitable time temperature condition, a time of one hour at 100° C. being preferred. To yield the desired range in degree of substitution, 0.3 to 0.8, a molar ratio of carboxyalkylating agent to dextran anhydroglucose unit of between 1:1 and 4.3:1 is used and preferably a ratio of 2.1:1. The alkali metal hydroxide is used in an amount slightly in excess of that required to react with the chloroacid used in carboxyalkylating.

As indicated, other carboxyalkylating agents can be used such as monochloropropionic acid and a monochlorobutyric acid. Other alkali metal hydroxides such as potassium hydroxide can be used.

The alkali metal carboxyalkyl dextran can be isolated prior to reacting it with the heavy metal salt or preferably the metal salt (ferric chloride) and alkali metal hydroxide (sodium hydroxide) is added to the carboxyalkylation reaction mixture. Where low degrees of substitution are used it is desirable to add sodium glycolate (or other equivalents) to augment that hydroxy acid formed as a by-product in the carboxyalkylation reaction.

The present of the sodium glycolate facilitates the addition of the metal salt in that it prevents precipitation of the metal hydroxide and insures a more soluble product. If the alkali metal salt of the carboxyalkyl dextran is to be isolated it can be done by adding to the reaction mixture an insolubilizing agent, preferably methanol or ethanol. Further purification may be accomplished by re-dissolving the precipitate in water and reprecipitating as before.

In the preparation of the corresponding carboxyalkyl dextran complexes of the heavy metals, e.g., the carboxymethyl dextran complexes of iron, copper, molybdenum, and the like, the desired alkali metal carboxyalkyl dextran is reacted with the desired heavy metal in the form of soluble compounds of the latter, for example ferric chloride, ferric nitrate, cupric chloride, cupric nitrate, molybdenum nitrate and the like, to form the corresponding heavy metal complexes of carboxyalkyl dextran. For this purpose, the metal compound is dissolved in a minimum amount of water and then added to the alkali metal carboxymethyl dextran solution over a period of time while maintaining the pH of the reaction mixture between 8.5 and 9.0 by the simultaneous addition of alkali metal hydroxide solution as needed. The resulting heavy metal complex of carboxyalkyl dextran is then recovered either by precipitation from the reaction solution by adding an approximately equal or excess volume of a precipitating agent, such as an anhydrous lower aliphatic alcohol or by adjusting the pH of the solution to 2.0–2.5 with hydrochloric acid.

The above reaction is preferably carried out in a manner such that no appreciable precipitation of the metal hydroxide occurs in the alkaline medium. Such metal hydroxide as is precipitated redissolves only very slowly and never completely in the reaction medium. To minimize the precipitation, the solution of the soluble heavy metal salt must be added at a very slow rate so that the precipitate reacts with the carboxyalkyl dextran to form the desired complex as rapidly as it is formed. It has been learned that this undesired precipitate can be prevented by incorporating in the reaction mixture a carrier for the metal ions which prevents the formation of the insoluble metal hydroxides. Such carrier compounds include sodium glycolate, sodium citrate, sodium lactate, sodium acetate, and the like. The presence of sodium glycolate, for example, when reacting ferric chloride with a carboxymethyl dextran in an alkali metal hydroxide solution prevents the formation of a precipitate of ferric hydroxide at the pH of the reaction, 8.5–9.0. Also, more completely soluble complexes result when the reaction is carried out in the presence of the sodium glycolate.

Products can be prepared with heavy metal contents as high as 45% though it is preferred to maintain a 20–30% level. The desired level is easily controlled by the amount of heavy metal salt added.

The most desirable characteristics, particularly with reference to therapeutic uses, are attained through—

(1) Control of the dextran molecular weight within the range of 1,000 to 50,000, preferably 15,000 to 25,000.

(2) Control of the degree of substitution of carboxyalkyl groups in the carboxyalkyl dextran within the limits of 0.3 to 0.8, preferably 0.4 to 0.6.

(3) Control of the pH of the heavy metal salt carboxyalkyl dextran reaction within the range 8.0 to 9.5, preferably 8.5 to 9.0.

(4) Control of the heavy metal content to a limit of 45%, preferably within the range 20–30%.

(5) Carrying out the heavy metal salt carboxyalkyl dextran reaction in the presence of a carrier agent such as sodium glycolate, sodium citrate, sodium acetate, etc.

The iron-carboxymethyl dextran complex is of particular interest with respect to therapeutic application. At the level of 20–30% iron content the product as prepared under the controls specified is a light brown free flowing powder. It is readily and completely water-soluble and the solutions are very stable in storage and under the conditions of temperature sterilization. The product is soluble in water at the pH range 6.0 to 7.0 and is thus adaptable to compounding with vitamins such as $B_{12}$. In this pH range the water solutions are of surprisingly low viscosity even at such concentrations as contain 100 mg. iron per ml. This is especially true if sodium citrate is present in the solution. The complex is insoluble in water at the pH 2.0 and under such environment produces ferric ions only very slowly. Suspended in water at pH 2.0 with agitation at a temperature of 100° F. for one hour, only 4 to 8% of the iron content is converted to ionic iron.

The following examples are given to illustrate specific embodiments of the invention, it being understood that these examples are not intended to be limiting of the invention. Parts are given by weight unless otherwise specified.

*Example I*

To a solution comprising 100 grams of native dextran (NRRL B–512) dissolved in 750 ml. of water there is added 20 ml. of concentrated hydrochloric acid. The solution is heated to 85° F. with stirring until the molecular weight of the dextran is reduced to 15,000 to 25,000. This is determined by relative viscosity measurements, the latter in turn checked by light scattering techniques. When the desired molecular weight range has been reached the solution is made alkaline by addition of 64 g. sodium hydroxide dissolved in 50 ml. water. 150 grams of sodium chloroacetate is added to the reaction mixture in small portions over a period of one half hour so as to prevent excessive boiling. Heating is continued at 90–100° for one hour after which the solution is cooled to 20–25° C. 140 g. of sodium glycolate is added to the solution and the pH is adjusted to 9.0. Then 500 ml. of ferric chloride solution containing 100 g. iron per 1,000 ml. is added with stirring over a period of 1.5 hours along with the simultaneous addition of 40% sodium hydroxide solution, the latter rate adjusted to maintain the pH of the reaction at 8.5 to 9.0. The reaction mixture is then stirred for one hour, filtered, and poured into one volume methanol with rapid stirring. The precipitate is allowed to settle and the supernatant liquor decanted. The residue is dissolved by addition of 500 ml. water and the solution poured slowly into 500 ml. methanol with rapid stirring. The precipitate is again allowed to settle and the supernatant liquor decanted. 500 ml. methanol is then added to the slurry and after thorough mixing, the precipitate is filtered. The resulting cake is suspended in methanol, filtered, washed with methanol, suspended in acetone, filtered, and washed with acetone. It is then dried in vacuo at 800° C. The resultant product, about 150 g., is a light brown free flowing powder and contains 27% iron. It is completely water-soluble and quite stable at pH 2.0.

*Example II*

One hundred and twenty-five grams of a carboxymethyl dextran of D.S. 0.5 and molecular weight of 15,000–25,000 is dissolved in 1500 ml. of water and the pH is adjusted to 9.0 with sodium hydroxide. To this is added simultaneously, with stirring, 500 ml. of a solution of ferric chloride containing 100 g. iron per 1000 ml. and a solution of sodium hydroxide of 40% concentration, the former at a rate sufficiently slow that the precipitate formed redissolves and the latter at a rate such as to maintain the pH at 8.5–9.0. The time usually required for the additions is 5–6 hours. A gummy precipitate forms even when the greatest care is taken during the addition; this is filtered off only with extreme difficulty. After filtering the solution, the iron complex of carboxymethyl dextran is precipitated by the methanol-acetone procedure as described in Example I. The product obtained, 160 g., is light brown in color, contains 25% iron, is water-soluble and is stable at pH 2.0.

*Example III*

One hundred and twenty grams of carboxymethyl dextran of D.S. 0.4 and molecular weight 15,000 to 25,000 is dissolved in 1500 ml. of water. To this is added 150 g. sodium glycolate. The pH of the resulting solution is then adjusted to 9.0 with sodium hydroxide. To the solution is then added simultaneously, with stirring, over a period of 90 minutes, a solution of 145 g. of ferric chloride in 500 ml. of water and a solution of 40% sodium hydroxide in amount sufficient to maintain the pH at 8.5–9.0. In the presence of the sodium glycolate there is no precipitate of ferric hydroxide formed and the resultant solution is readily filtered after the pH is adjusted to 8.5.

The iron complex of the carboxymethyl dextran is then precipitated by adjusting the pH to 2.5–3.0 with hydrochloric acid or it may be isolated by the methanol-acetone procedure outline in Example I. 150 g. of brown powder readily and completely soluble in water is obtained. It contains 27% iron.

*Example IV*

The procedure as described in Example I is followed, except that instead of adding 140 g. sodium glycolate to the carboxymethyl dextran solution 130 g. sodium lactate is added.

*Example V*

The procedure as described in Example III is followed, except that the 135 g. sodium acetate is added instead of 150 g. sodium glycolate.

*Example VI*

The procedure of Example I is followed, except that the dextran NRRL, B–512 is replaced by the dextran selected from dextran type 742, dextran NRRL 1159, dextran NRRL 1146 and dextran NRRL 1064, etc.

*Example VII*

The procedure of Example I is followed, except that the ferric chloride is replaced with copper sulphate. 500 ml. of cupric sulfate solution containing 107 g. copper per 1000 ml. is used. The product is bluish gray in color and contains 28% copper.

*Example VIII*

The procedure of Example I is used except that the ferric chloride is replaced with chromic chloride. The chromic chloride solution contains 88 g. chromium per 1000 ml. and 500 ml. are used. The product is a gray powder containing 21.5% chromium.

*Example IX*

The procedure of Example I is used, except that the ferric chloride solution contains an amount of cupric chloride, 500 ml. of a ferric chloride-cupric chloride, a solution containing 90 g. iron and 10.7 g. copper per 1000 ml. is used. The product is a brown powder soluble in water and contains 24.5% iron and 2.5% copper.

Heavy metal complexes of other carboxyalkyl dextrans are similarly obtained by following the procedures set forth in Examples 1–9, substituting for the carboxymethyl dextran other carboxyalkyl dextrans such as for example carboxyethyl dextran, carboxypropyl dextran, and the like, of the same general molecular weight and degree of substitution.

The heavy metal complexes of the carboxyalkyl dextrans obtained as above described can be administered therapeutically in the amounts required to give the amounts of the particular metals customarily prescribed wherever medication with the particular heavy metal is needed. They can be administered orally, in liquid form or in capsule or tablet form. They are readily soluble in water at pH values between 6.0 and 7.0. Where so required and where the particular heavy metal is susceptible of administration by injection, the heavy metal complexes of carboxyalkyl dextran are particularly suitable for administration in this manner because of the relatively low viscosities of their solutions (at pH 6.2–6.9) and because these solutions may be sterilized without decomposition.

It is well known that the water-soluble salts of such heavy metals as iron in the form of ferrous chloride and ferric nitrate are too highly acid for injection purposes. Attempts to adjust the pH of aqueous solutions of these salts result in the precipitation of iron as the insoluble ferric hydroxide. The difficulties encountered, however, were solved with the preparation of the iron complex of the carboxyalkyl dextrans, and the like heavy metal complexes of the carboxyalkyl dextrans, in accordance with this invention.

These heavy metal complexes of carboxyalkyl dextrans are soluble at a pH suitable for parenteral injection and hence provide a satisfactory method of medication not previously available. While the heavy metals, other than iron, are generally not used at this time for treating humans, the heavy metal complexes of the carboxyalkyl dextrans provide a useful method for introducing such heavy metals as copper, molybdenum, cobalt, and the like metals into plants and animals other than humans. They also provide a ready method for administering trace amounts of such metals. Where only traces of such metals are desired, they are readily obtained by adding to the ferric chloride used in Example I the required amount of water-soluble salts of the desired trace metal, as for example copper chloride, manganese chloride, or cobalt chloride. The final product will then be a mixture, in the desired proportion, of the iron, or other heavy metal, together with the trace amounts of the added metal.

Sterile iron-carboxymethyl dextran solutions are prepared by dissolving the dry, purified iron complex of carboxymethyl dextran powder in distilled water to give up to 100 mg. of iron per ml. The pH of the solution is adjusted with hydrochloric acid or citric acid to 6.0–7.0. Solutions as thus prepared are filtered through a No. 1 Whatman paper placed over a silk screen (which removes minute filter paper fibers) and are sterilized at 121° C. for 15 minutes.

Modifications and substitutions may be made in the process, as will be understood by those skilled in the art, to produce various metal carboxyalkyl dextran complexes, and which are intended to come within the scope of this invention as defined in the appended claims.

What is claimed is:
1. A method of preparing iron carboxymethyl dextran which comprises reacting an aqueous alkaline solution of ferric chloride with an aqueous solution of carboxymethyl dextran having a D.S. value of approximately 0.5 and an average molecular weight between about 15,000 and 25,000, thereafter maintaining the resultant solution at a pH of 8.5 to 9.0, and precipitating the iron salt of carboxymethyl dextran by the addition of methanol, and filtering to recover the precipitate and washing the same with acetone, and drying the washed precipitate under vacuum conditions at about 800° C. to produce a water-soluble free flowing powder composed of iron carboxymethyl dextran containing approximately 27% iron.

2. The water-soluble iron complex of carboxymethyl dextran having a D.S. of 0.5 and an average molecular weight between 15,000 and 25,000 and which is resistant to iron release under acidic environment but readily assimilable by the animal body, said iron complex of carboxymethyl dextran containing approximately 27% iron and being produced by reacting a mixture of ferric chloride and sodium chloride dissolved in water and maintained at a pH of 8.5 to 9.0 and in which solution is admixed sodium glycolate and carboxymethyl dextran, and precipitating the iron carboxymethyl dextran from the resultant solution by the addition thereto of methanol and filtering and drying the precipitate to provide a free flowing water-soluble product.

References Cited in the file of this patent
UNITED STATES PATENTS

| | | |
|---|---|---|
| 2,816,060 | Carter | Dec. 10, 1957 |
| 2,856,398 | Novak | Oct. 14, 1958 |
| 2,862,920 | Berger et al. | Dec. 2, 1958 |
| 2,885,393 | Herb | May 5, 1959 |
| 2,957,806 | Rummel | Oct. 25, 1960 |
| 3,000,872 | Novak | Sept. 19, 1961 |